US008782044B2

(12) United States Patent
Kang

(10) Patent No.: US 8,782,044 B2
(45) Date of Patent: Jul. 15, 2014

(54) FILE MANAGEMENT APPARATUS AND METHOD

(75) Inventor: Hyung-jong Kang, Seoul (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 744 days.

(21) Appl. No.: 12/172,295

(22) Filed: Jul. 14, 2008

(65) Prior Publication Data

US 2009/0037383 A1 Feb. 5, 2009

(30) Foreign Application Priority Data

Aug. 2, 2007 (KR) ........................ 10-2007-0077819

(51) Int. Cl.
*G06F 7/00* (2006.01)
*G06F 17/30* (2006.01)

(52) U.S. Cl.
USPC ......................................... 707/736; 715/769

(58) Field of Classification Search
USPC .................... 707/736, 999.003, 758; 715/769
See application file for complete search history.

(56) References Cited

U.S. PATENT DOCUMENTS

| 7,925,682 | B2 | 4/2011 | Moore et al. | |
|---|---|---|---|---|
| 8,117,226 | B2 | 2/2012 | Samji et al. | |
| 2002/0059337 | A1* | 5/2002 | Takaoka et al. | 707/500 |
| 2002/0083079 | A1* | 6/2002 | Meier et al. | 707/104.1 |
| 2002/0087602 | A1* | 7/2002 | Masuda et al. | 707/515 |
| 2004/0098379 | A1* | 5/2004 | Huang | 707/3 |
| 2004/0103376 | A1* | 5/2004 | Pandey | 715/526 |
| 2004/0145611 | A1* | 7/2004 | Ogawa et al. | 345/765 |
| 2004/0190057 | A1* | 9/2004 | Takahashi et al. | 358/1.15 |
| 2004/0193621 | A1 | 9/2004 | Moore et al. | |
| 2005/0065773 | A1* | 3/2005 | Huang et al. | 704/7 |
| 2005/0105129 | A1* | 5/2005 | Takahashi | 358/1.15 |
| 2005/0166139 | A1* | 7/2005 | Pittman et al. | 715/511 |
| 2005/0267894 | A1* | 12/2005 | Camahan | 707/10 |
| 2006/0106830 | A1* | 5/2006 | Mochizuki | 707/100 |
| 2006/0241988 | A1* | 10/2006 | Yaskin et al. | 705/7 |
| 2006/0282417 | A1* | 12/2006 | Isoda | 707/3 |
| 2007/0079227 | A1* | 4/2007 | Singh et al. | 715/500 |
| 2007/0130177 | A1* | 6/2007 | Schneider et al. | 707/100 |
| 2008/0134024 | A1* | 6/2008 | Masuda et al. | 715/255 |
| 2009/0171983 | A1 | 7/2009 | Samji et al. | |
| 2011/0145282 | A1 | 6/2011 | Moore et al. | |

FOREIGN PATENT DOCUMENTS

JP 2005-108001 4/2005
KR 2005-0121683 12/2005

OTHER PUBLICATIONS

Korean Office Action dated Sep. 27, 2013 issued in KR Application No. 10-2007-0077819.

* cited by examiner

*Primary Examiner* — Robert Beausoliel, Jr.
*Assistant Examiner* — Nicholas Allen
(74) *Attorney, Agent, or Firm* — Stanzione & Kim, LLP

(57) ABSTRACT

A file management apparatus includes a storage unit to store a binder to bind one or more files, and a controller to provide a file management window including a binder display field, and to support a function of searching for the stored binder using the file management window. Therefore, files are bound through the binder display field to manage and search for files. Accordingly, utility of binders may increase.

17 Claims, 6 Drawing Sheets

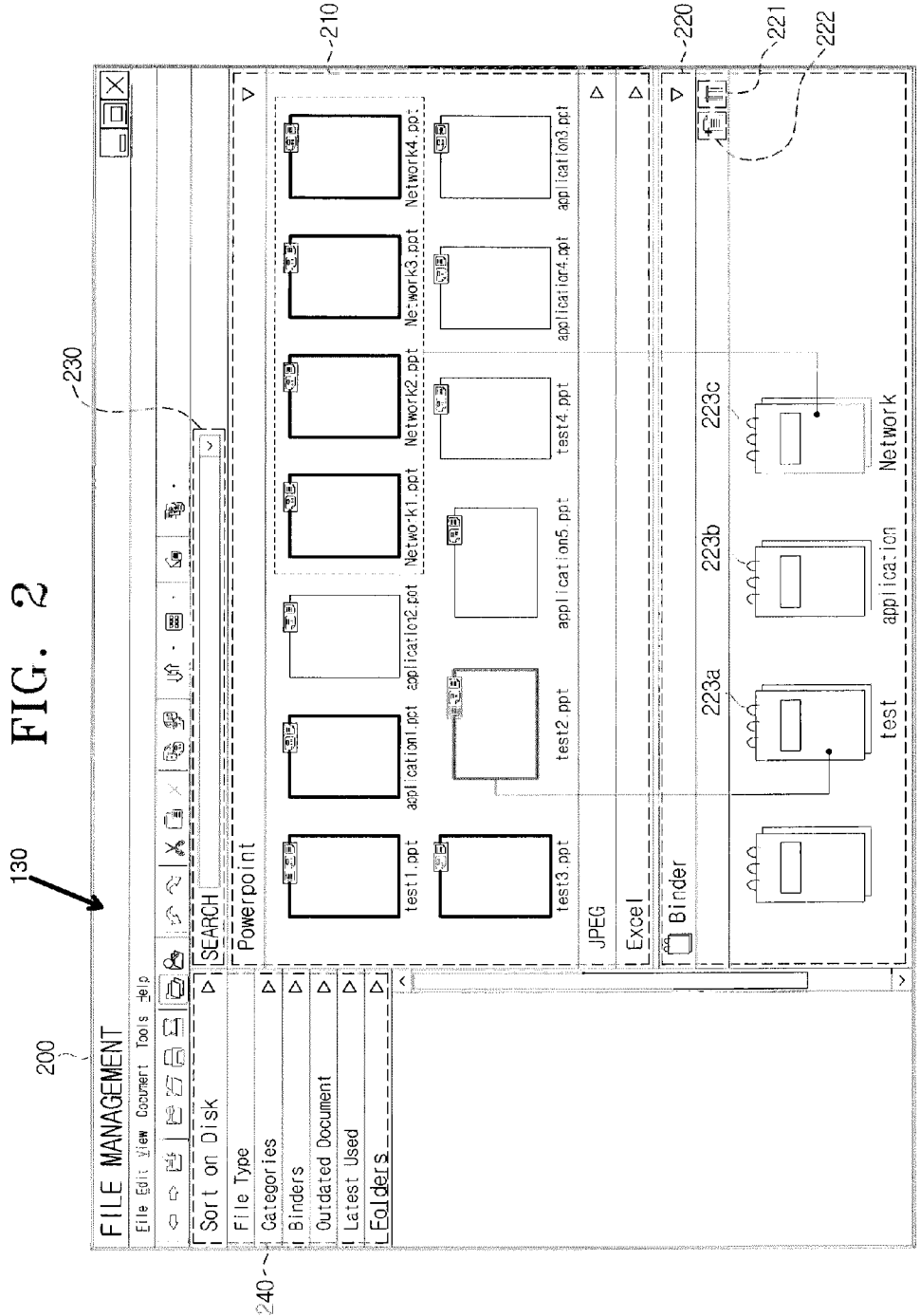

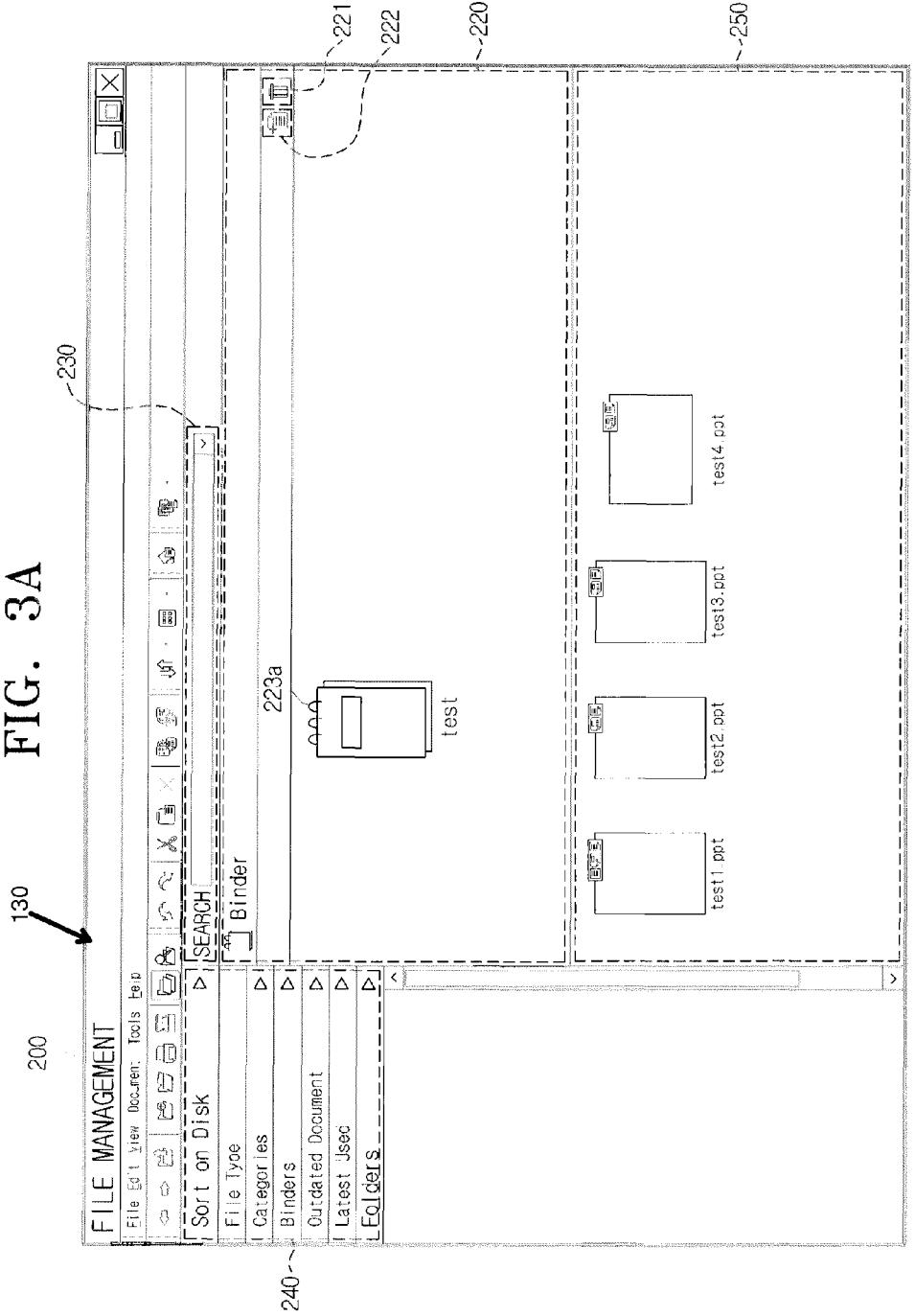

FILE MANAGEMENT APPARATUS AND METHOD

CROSS-REFERENCE TO RELATED APPLICATIONS

This application claims priority under 35 U.S.C. §119 (a) from Korean Patent Application No. 10-2007-0077819, filed on Aug. 2, 2007, in the Korean Intellectual Property Office, the disclosure of which is incorporated herein by reference in its entirety.

BACKGROUND OF THE INVENTION

1. Field of the Invention

The present general inventive concept relates to a file management apparatus and method. More particularly, the present general inventive concept relates to a file management apparatus in which a binder display field is contained in a file management window, so that a user may search for and manage files by binding files.

2. Description of the Related Art

In an office environment, in which computers are indispensable, efficiently managing large numbers of files stored on computer is necessary. To achieve this, a binder may be generated in order to bind and manage files associated with each other. However, if files are bounded in the binder, the original file may be bound together with identical files increasing difficulty to secure storage space of a file management apparatus such as a computer. In particular, since a large number of files are used in an office, binding an original file with identical files causes a reduction in the storage capacity.

Additionally, even if the user desires to manage files using the binder, the user needs to individually check a desired file without using the binder when searching for the desired file. Accordingly, while searching for files, the binder is generally not utilized. Furthermore, a separate field to manage a binder is not included in a conventional file management apparatus 100, so if a user searches for files bound in the binder, different type of files may also be searched for other than the bound files, broadening a search range. Therefore, time required for searching may be extended, which causes inconvenience to the user.

SUMMARY OF THE INVENTION

The present general inventive concept provides a file management apparatus and a file management method, in which files are managed and searched for by binding files through a binder display field contained in a file management window to increase a utility of binders.

The present general inventive concept also provides a file management apparatus and a file management method, in which only file information indicating file attributes is bound when files are bound in binders to facilitate a large storage capacity.

Additional aspects and utilities of the present general inventive concept will be set forth in part in the description which follows and, in part, will be obvious from the description, or may be learned by practice of the general inventive concept.

The foregoing and/or other aspects and utilities of the present general inventive concept may be achieved by providing a file management apparatus including a storage unit to store a binder to bind one or more files, and a controller to provide a file management window including a binder display field, and to support a function of searching for the stored binder using the file management window.

The controller may provide on the file management window an information input menu through which a user can input binder information corresponding to a binder the user wishes to search for. If the binder information is input through the information input menu, the controller may search for binders corresponding to the input binder information from the storage unit and may display binders as a result of the search in the binder display field.

If at least one binder is selected from the binder display field, the controller may display on the file management window a file information display field to display information pertaining to files in the selected binder.

The controller may provide a file display field together with the binder display field in the file management window, and may bind files selected from the file display field into the binder selected from the binder display field.

Only file information indicating file attributes may be bound in the binder in the file management apparatus.

The foregoing and/or other aspects and utilities of the present general inventive concept may also be achieved by providing a file management method of a file management apparatus, the method including providing a file management window including a binder display field, and searching for pre-stored binders using binder information input using the file management window.

The searching may include providing in the file management window an information input menu through which a user can input binder information on a binder the user wishes to search for, and if the binder information is input through the information input menu, searching for a binder corresponding to the input binder information.

The method may further include displaying binders as a result of the search in the binder display field.

The method may further include, if at least one binder is selected from the binder display field, displaying on the file management window a file information display field to display information pertaining to files in the selected binder.

The providing may include generating a file display field together with the binder display field on the file management window.

The method may further include binding files selected from the file display field into the binder selected from the binder display field.

Only file information indicating file attributes may be bound in the binder.

The foregoing and/or other aspects and utilities of the general inventive concept may also be achieved by providing a graphical user interface (GUI) usable with a file management apparatus, the GUI including a file display field to display files in the file management apparatus, a binder display field to display binders to bind and to manage the files, an information input menu field to input information for which to search, and a file classification field to classify the files corresponding to a selection of one or more sub-fields.

The GUI may further include a file information display field to display file information on the files in the respective binders.

The shortcut information can include one or more of a storage location, a name, a generation date, a format and a first page image.

The foregoing and/or other aspects and utilities of the general inventive concept may also be achieved by providing file management apparatus including a storage unit to store files, and a graphical user interface (GUI) including a file display field to display files stored in the storage unit, a binder display field to display binders to bind and to manage the files, an information input menu field to input information for which to search, and a file classification field to classify the files corresponding to a selection of one or more sub-fields.

The foregoing and/or other aspects and utilities of the general inventive concept may also be achieved by providing a binder generation method of a file management apparatus, the method including displaying a file management window having a file display field and a binder display field, selecting files from the file display field to bind the files in one or more binders, and binding the selected files into the respective one or more binders.

The foregoing and/or other aspects and utilities of the general inventive concept may also be achieved by providing a computer-readable recording medium having embodied thereon a computer program to execute a method, wherein the method includes displaying a file management window having a file display field and a binder display field, selecting files from the file display field to bind the files in one or more binders, and binding the selected files into the respective one or more binders.

BRIEF DESCRIPTION OF THE DRAWINGS

These and/or other aspects and utilities of the present general inventive concept will become apparent and more readily appreciated from the following description of the embodiments, taken in conjunction with the accompanying drawings of which:

FIG. 2 is an exemplary view illustrating a file management window displayed during a binder generation process, according to an exemplary embodiment of the present general inventive concept;

FIGS. 3A and 3B are exemplary views illustrating a file management window displayed during a binder search process, according to exemplary embodiments of the present general inventive concept;

DETAILED DESCRIPTION OF THE PREFERRED EMBODIMENTS

Figure 1:
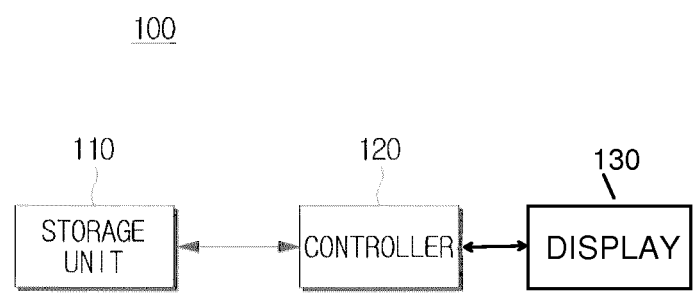
FIG. 1 is a block diagram illustrating a file management apparatus according to an exemplary embodiment of the present general inventive concept.

Reference will now be made in detail to embodiments of the present general inventive concept, examples of which are illustrated in the accompanying drawings, wherein like reference numerals refer to the like elements throughout. The embodiments are described below in order to explain the present general inventive concept by referring to the figures.

FIG. 1 is a block diagram illustrating a file management apparatus according to an exemplary embodiment of the present general inventive concept. A file management apparatus 100 of FIG. 1 includes a storage unit 110 and a controller 120. The file management apparatus 100 may be a host device such as a computer.

The storage unit 110 may store binders to bind one or more files. Additionally, the storage unit 110 may also store original files of files bound in the binders, together with the bound files. In this situation, the original files may be various type of files, such as generated files, mail messages transmitted and received, and downloaded files, using application programs of the file management apparatus 100. The files in the binders include only file information indicating file attributes, not an entire original file. Specifically, the file information may include information regarding storage location, name, generation date, format (for example, a file extension) and a first page image of files. The file information may be stored in a form of a shortcut file in the binders. The storage unit 110 may be a hard disk drive (HDD), which is a large capacity storage medium.

The controller 120 may perform an entire operation of the file management apparatus 100 in order to manage files. Specifically, the controller 120 may provide a file management window. In this situation, the file management window may be provided by launching a file management program. In the file management apparatus 100, SmarThru Office may be used as a program to manage files.

Figure 3B:
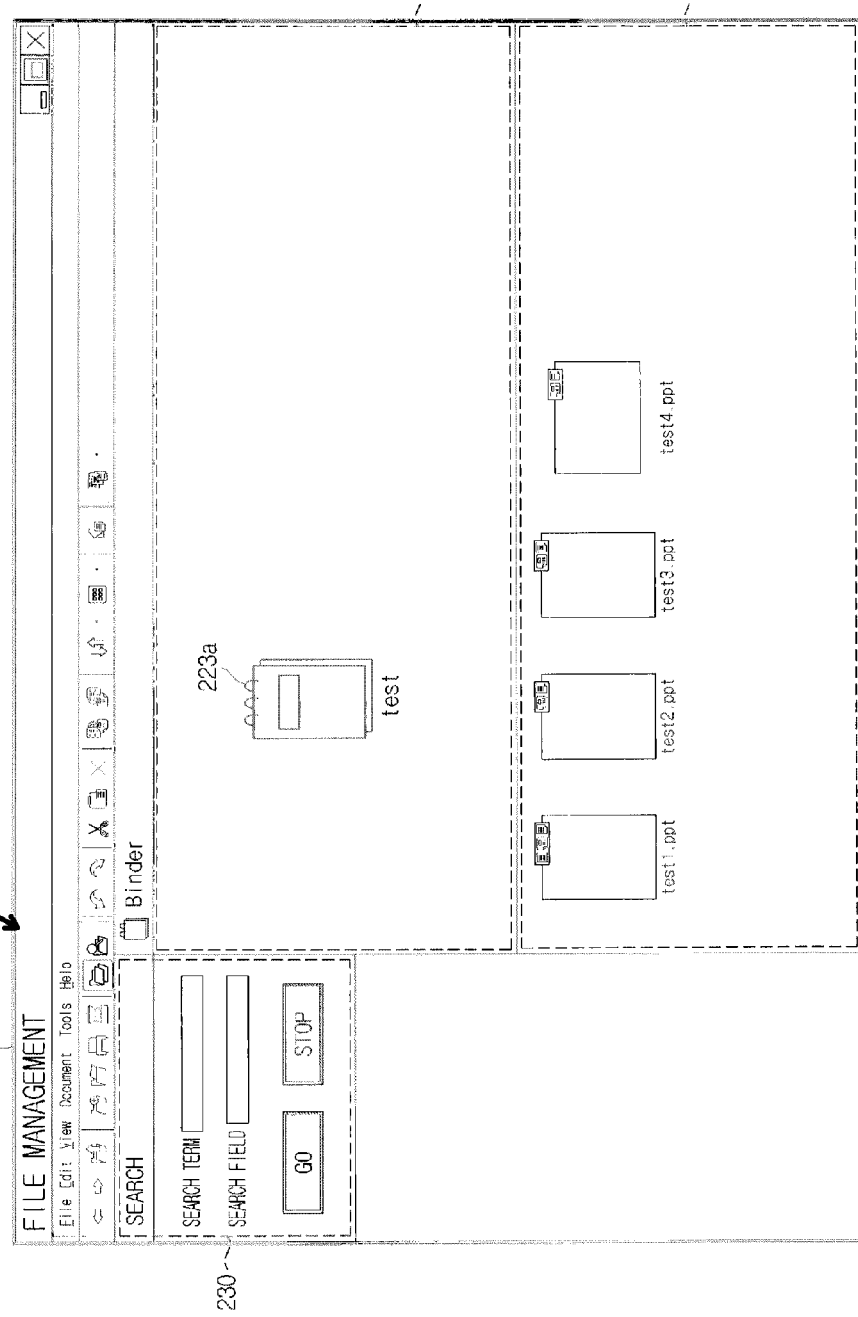

The controller 120 may output a file management window on a display 130, as illustrated in FIGS. 2-3B. The file management window may include a file display field and a binder display field. The file display field may function to display the files stored in the file management apparatus 100. The files may be classified according to a respective format thereof, such as a respective file extension thereof, and displayed on the file display field, or all the files may be displayed on a single screen. Additionally, the binder display field may be used to display binders.

If at least one file is selected from among the files displayed on the file display field and if the selected file is moved to a binder of the binder display field, the controller 120 may bind the selected file to the corresponding binder. That is, the selected file may be dragged and dropped in the binder, so that the selected file may be contained in the binder. In this situation, the controller 120 may bind only file information indicating file attributes, not the entire original file. For example, if a user selects a file "test1.ppt" from the file display field and moves the selected file to a binder "test", only file information pertaining to "test1.ppt" may be included in the binder "test". In more detail, only information regarding the storage location, name, generation date, extension and first page image of file "test1.ppt", may be bound. Accordingly, files may be managed using the binders of the binder display field, so the utility of binders may increase.

The controller 120 may also provide a file management window including an information input menu field and a file information display field. The information input menu field may be a field in which a user may input binder information concerning a binder the user wishes to search. If a binder is selected from binders displayed as a result of the search, the file information display field may display file information contained in the displayed binder.

If the binder information is input through the information input menu field, the controller 120 may search for a binder corresponding to the binder information from the storage unit 110, and may display binders corresponding to the binder information in the binder display field. For example, if a user enters the term "test" as binder information, the controller 120 may search for binders with names containing the term "test", so that the binders may be displayed as a result of the search in the binder display field.

If a binder displayed in a binder display field is selected, the controller 120 may display file information contained in the selected binder in the file information display field. In this situation, in the file information display field, thumbnail images of the first page of each of the bound files may be displayed, and the name of the files and a respective file extension thereof may also be displayed. Additionally, if one of the file information displayed in the file information display field is selected, the controller 120 may retrieve the original file corresponding to the selected file using the selected file information. Specifically, the controller 120 may retrieve the original file using information regarding the storage location and name of the selected file, and then display the file as a result of the search on a screen. Accordingly, searching for files using the binders facilitates a searching process.

FIG. 2 is an exemplary view illustrating a file management window displayed during a binder generation process, according to an exemplary embodiment of the present general inventive concept. A file management window 200 of FIG. 2 may be provided to manage files stored in the file management apparatus 100, and may be displayed on the screen by launching the file management program.

FIG. 2 illustrates a file management window 200 to be displayed when files are bound in binders. The file management window 200 of FIG. 2 includes a file display field 210, a binder display field 220, an information input menu field 230 and a file classification field 240.

The file display field 210 may display the files stored in the file management apparatus 100, and the files may be classified according to a respective file format thereof. In more detail, the files displayed on the file display field 210 may be classified according to whether the files are PowerPoint, JPEG, and Excel or other formats.

The binder display field 220 of the file management window 200 may allow the files to be classified according to which other files the files are associated with in order to more efficiently manage files. The binder display field 220 may display binders 223a, 223b and 223c to bind and manage files. If the user wishes to add a binder to the binder display field 220, the user may select an "add" icon 221 at a top righthand side of the binder display field 220, and if the user wishes to remove a binder from the binder display field 220, the user may select a "delete" icon 222 at the top righthand side of the binder display field 220.

Additionally, if the user wishes to bind files "test1.ppt" to "test4.ppt" in the test binder 223a displayed in the binder display field 220, the user may move files "test1.ppt" to "test4.ppt" to the test binder 223a. In this situation, each file may be moved to the test binder 223a by a drag-and-drop operation, or using a touch screen, a mouse or a keyboard. Additionally, files "Network1.ppt" to "Network4.ppt" of the file display field 210 can be moved to the Network binder 223c displayed in the binder display field 220, so that the files may be contained in the binder. According to this process, the files may be classified and collected according to which other files they are associated with. When the files are bound, only shortcut information, such as information regarding the storage location, name, generation date, format and first page image of files, may be included in the binder, instead of the entire original file. Therefore, the storage capacity of the file management apparatus 100 may be maintained.

The information input menu field 230 of the file management window 200 may enable a user to input information to search. The file classification field 240 may classify files according to a sub-field, such as a file type or category, whether they are binders or folders, or whether a file is an old file or a recently used file. If one sub-field is selected from the file classification field 240, only files in the selected sub-field may be displayed. The information input menu field 230 and file classification field 240 will be described in detail below.

FIGS. 3A and 3B are exemplary views illustrating a file management window displayed during a binder search process, according to exemplary embodiments of the present general inventive concept. FIG. 3A illustrates a file management window 200 to search for binders. The file management window 200 of FIG. 3A includes a binder display field 220, an information input menu field 230, a file classification field 240 and a file information display field 250.

If the user desires to search for files in binders, the binder display field 220 may be displayed. In more detail, the user may display the binder display field 220 of FIG. 2 by double-clicking, selecting a maximize icon to maximize the binder display field 220, or selecting a sub-field "binders" of the file classification field 240.

After the binder display field 220 is displayed, the user may input a search term concerning a binder the user wishes to search, in the information input menu field 230. For example, if the user enters "test" as a search term, binders containing the term "test" may be displayed among the binders contained in the binder display field 220. Next, if the user selects the binder 223a displayed in the binder display field 220, file information on the files in the selected binder 223a may be displayed in the file information display field 250. As illustrated in FIG. 3A, a first page image of each file in the binder 223a may be displayed in the form of a thumbnail image, and the name of the files and respective file formats thereof (for example, file extensions) may also be displayed. Accordingly, the user may view the file information in the binder 223a.

Additionally, if the user wishes to check a predetermined file after viewing the file information in the file information display field 250, the user may click on file information corresponding to the predetermined file in the file information display field 250. In this situation, the file management apparatus 100 may retrieve a file using the clicked file information. Specifically, the file management apparatus 100 may search for a file having the clicked file name at the storage location of the predetermined file, and may then display the file obtained as a result of the search on the screen. Accordingly, the file may be found using the binder contained in the binder display field 220.

FIG. 3B illustrates a file management window 200 to search for binders according to another exemplary embodiment of the present general inventive concept. The file management window 200 of FIG. 3B includes a binder display field 220, an information input menu field 230, and a file information display field 250.

If a search command is input, the file management apparatus 100 may display the file management window 200 with the information input menu field 230. At this time, the user may input search information, such as a search term or a search location, into the information input menu field 230. If the search term and search location are input in the information input menu field 230, the file management apparatus 100 may search for a document corresponding to the search term at the input search location. For example, if "test" and "binder" are input as a search term and a search location, respectively, in the information input menu field 230, the file management apparatus 100 may search for a binder the name of which contains the term "test" from among the binders in the binder display field 220. Accordingly, the binder 223a may be displayed in the binder display field 220.

When the binder 223a is displayed in the binder display field 220, if the binder 223a is selected, file information on the files in the binder 223a may be displayed in the file information display field 250. Therefore, the user may manage and search for files using the binders of the binder display field 220.

Figure 4:
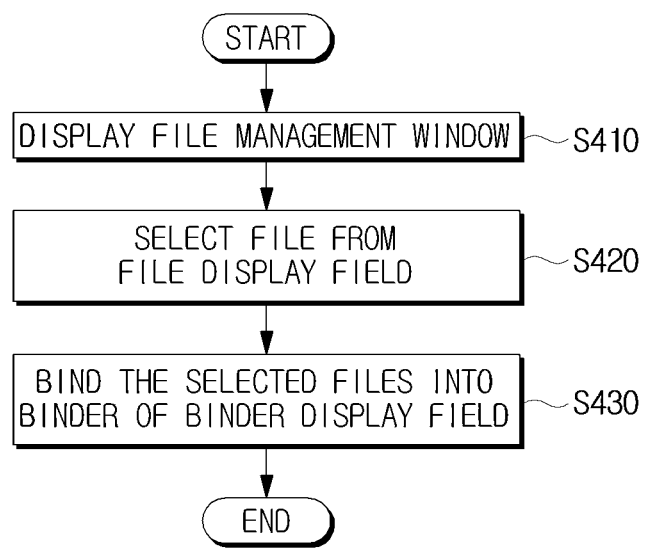
FIG. 4 is a flowchart illustrating a binder generation method according to an exemplary embodiment of the present general inventive concept.

FIG. 4 is a flowchart illustrating a binder generation method according to an exemplary embodiment of the present general inventive concept. In FIG. 4, the file management apparatus 100 may launch a file management program to display a file management window in operation S410.

The file management apparatus 100 may then select files from a file display field included in the file management window in order to bind the files in binders in operation S420. The binders may be used to classify the files according to which other files they are associated with, and to manage the files, so that the user may efficiently manage the files.

The file management apparatus 100 may bind the selected files into the binders of a binder display field included in the file management window in operation S430. Operations S420 and S430 may be performed by a drag-and-drop operation, or using a touch screen, a mouse or a keyboard. In this situation, only file information indicating file attributes may be stored in the form of a shortcut file in the binders, rather than the entire original file. Therefore, minimizing consumption of storage space of the file management apparatus 100 is accomplished.

Figure 5:
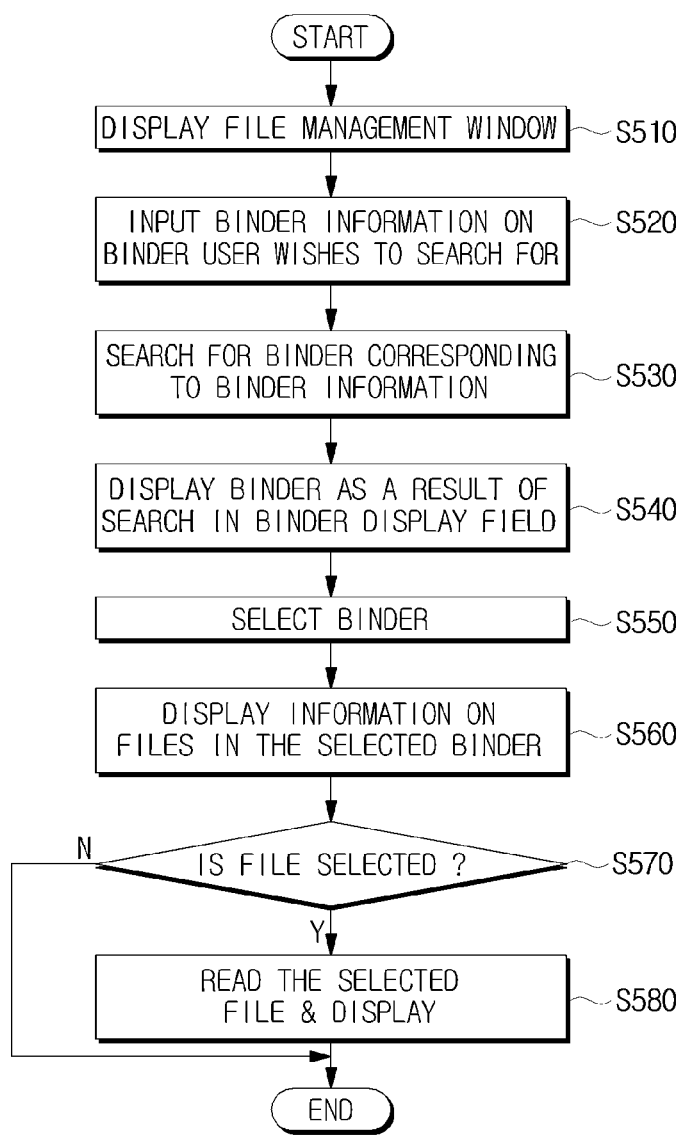
FIG. 5 is a flowchart illustrating a file management method according to an exemplary embodiment of the present general inventive concept.

FIG. 5 is a flowchart illustrating a file management method according to an exemplary embodiment of the present general inventive concept. In FIG. 5, the file management apparatus 100 may launch a file management program to display a file management window in operation S510. The file management window may have the forms illustrated in FIGS. 2, 3A and 3B.

The file management apparatus 100 may receive binder information in operation S520. Specifically, the displayed file management window may include an information input menu through which a user may input binder information in order to search for a binder. Accordingly, the user may input binder information, for example the title of binders the user wishes to search, in the information input menu.

Next, the file management apparatus 100 may search for binders corresponding to the input binder information in operation S530.

The file management apparatus 100 may display binders corresponding to the input binder information in a binder display field in operation S540. In this situation, the binder display field may be used to separately display only generated binders. If the user searches for a binder, only the binders corresponding to the input binder information may be displayed in the binder display field.

If a binder is selected from among the binders displayed in the binder display field in operation S550, the file management apparatus 100 may display file information pertaining to files in the selected binder in operation S560. During operation S550, a file information display field may appear at a top or a bottom of the binder display field, and the file information may be displayed in the file information display field. The file information may include a first page image of files displayed in the form of thumbnail images, and the name of files displayed adjacent to the first page images. Therefore, the user may locate desired files by checking the thumbnail images and file names.

If a file is selected from the file information display field in operation S570, the file management apparatus 100 may search for the selected file and then display the file as a result of the search on the screen in operation S580. That is, if the file is selected, the original file of the selected file may be read using information regarding the selected file, and the read file may be displayed.

Although the file management apparatus 100 is employed in a host device in this exemplary embodiment of the present general inventive concept, the file management apparatus 100 may be applied to a multifunction peripheral (MFP) in order to manage and search for files. Specifically, if the present general inventive concept is applied to the MFP, binding files generated by printing, copying, transmitting facsimiles and scanning to more easily manage and search for files is accomplished.

The present general inventive concept can also be embodied as computer-readable codes on a computer-readable medium. The computer-readable medium can include a computer-readable recording medium and a computer-readable transmission medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

As described above, according to various embodiments of the present general inventive concept, binders are managed through a separate binder display field to more easily manage and search for files bound in the binders. Therefore, utility of binders may increase.

Additionally, only file information indicating file attributes may be bound when files are bound in the binders, and thus greater storage space may be maintained.

Although various embodiments of the present general inventive concept have been illustrated and described, it will be appreciated by those skilled in the art that changes may be made in these embodiments without departing from the principles and spirit of the general inventive concept, the scope of which is defined in the appended claims and their equivalents.

What is claimed is:

1. A file management apparatus, comprising:
   a storage unit to store a binder to bind one or more files; and
   a controller in electrical communication with the storage unit to provide a file management window including a binder display field, and to support a function of searching for the stored binder in the storage unit using the file management window by allowing a user to input a desired search term and a specific type of location in which the search term is stored such that the specific type of location is selected from among a binder and a folder,
   wherein the controller provides a file display field together with the binder display field in the file management window, and binds files selected from the file display field into the binder selected from the binder display field, and
   wherein the files on the file display field included in the one file management window with the binder display field are bound into the binders on the binder display field by being dragged and dropped.

2. The file management apparatus of claim 1, wherein the controller provides on the file management window an information input menu through which a user can input binder information corresponding to a binder the user wishes to search for,
   wherein if the binder information is input through the information input menu, the controller searches for binders corresponding to the input binder information from the storage unit and displays binders as a result of the search in the binder display field.

3. The file management apparatus of claim 1, wherein, if at least one binder is selected from the binder display field, the controller displays on the file management window a file information display field to display information pertaining to files in the selected binder.

4. The file management apparatus of claim 1, wherein only file information indicating file attributes is bound in the binder.

5. A file management method of a file management apparatus, the method comprising:
providing a file management window including a binder display field and a file display field;
searching for pre-stored binders using binder information input using the file management window by allowing a user to input a desired search term and a specific type of location in which the search term is stored such that the specific type of location is selected from among a binder and a folder; and
binding files selected from the file display field into the binder selected from the binder display field,
wherein the files on the file display field included in the one file management window with the binder display field are bound into the binders on the binder display field by being dragged and dropped.

6. The method of claim 5, wherein the searching comprises:
providing in the file management window an information input menu through which a user can input binder information corresponding to a binder the user wishes to search for; and
if the binder information is input through the information input menu, searching for a binder corresponding to the input binder information.

7. The method of claim 5, further comprising:
displaying binders as a result of the search in the binder display field.

8. The method of claim 5, further comprising:
if at least one binder is selected from the binder display field, displaying on the file management window a file information display field to display information pertaining to files in the selected binder.

9. The method of claim 5, wherein only file information indicating file attributes is bound in the binder.

10. A graphical user interface (GUI) usable with a file management apparatus including a display, the GUI comprising:
a file display field displayed on the display to indicate files in the file management apparatus;
a binder display field displayed on the display to indicate binders to bind and to manage the files;
an information input menu field displayed on the display to input information used to search for a binder among the displayed binders by allowing a user to input a desired search term and a specific type of location in which the search term is stored such that the specific type of location is selected from among a binder and a folder; and
a file classification field displayed on the display to classify the files corresponding to a selection of one or more sub-fields,
wherein the files on the file display field included in the one file management window with the binder display field are bound into the binders on the binder display field by being dragged and dropped.

11. The GUI of claim 10, further comprising:
a file information display field to display file information on the files in the respective binders.

12. The GUI of claim 11, wherein shortcut information is included with the respective binder of bound files.

13. The GUI of claim 12, wherein the shortcut information comprises:
one or more of a storage location, a name, a generation date, a format and a first page image.

14. A file management apparatus, comprising:
a storage unit to store files; and
a graphical user interface (GUI) comprising:
a file display field to display files stored in the storage unit;
a binder display field to display binders to bind and to manage the files;
an information input menu field to input information for which to search for a binder among the displayed binders by allowing a user to input a desired search term and a specific type of location in which the search term is stored such that the specific type of location is selected from among a binder and a folder;
wherein the files on the file display field included in the one file management window with the binder display field are bound into the binders on the binder display field by being dragged and dropped.

15. A binder generation method of a file management apparatus, the method comprising:
searching for a binder among the displayed binders by allowing a user to input a desired search term and a specific type of location in which the search term is stored such that the specific type of location is selected from among a binder and a folder;
displaying a file management window having a file display field and a binder display field as one window;
selecting files from the file display field to bind the files in one or more binders; and
binding the selected files into the respective one or more binders,
wherein the selected files are bound into the binders on the binder display field by being dragged and dropped.

16. A computer-readable recording medium having embodied thereon a computer program to execute a method, wherein the method comprises:
searching for a binder among the displayed binders by allowing a user to input a desired search term and a specific type of location in which the search term is stored such that the specific type of location is selected from among a binder and a folder;
displaying a file management window having a file display field and a binder display field as one window;
selecting files from the file display field to bind the files in one or more binders; and
binding the selected files into the respective one or more binders.

17. A binder generation apparatus, comprising:
a storage unit to store a plurality of original files and at least one binder to bind one or more bound files; and
a controller to provide a file management window including a file display field to display at least one original file among the plurality of original files and including a file binder display field to display that at least one binder as one window, the controller being in electrical communication with the storage unit to convert the at least one original file displayed in the file display field into a bound file, to bind a plurality of bound files in the at least one binder, and to support a function of searching for the stored binder in the storage unit using the file management window by allowing a user to input a desired search term and a specific type of location in which the search term is stored such that the specific type of location is selected from among a binder and a folder,
wherein each bound file among the plurality of bound files in the binder is digitally linked to a respective original file that is different from another respective file, and
wherein the at least one original file on the file display field is bound into the at least one binder on the file binder display field by being dragged and dropped.

* * * * *